Patented Oct. 26, 1954

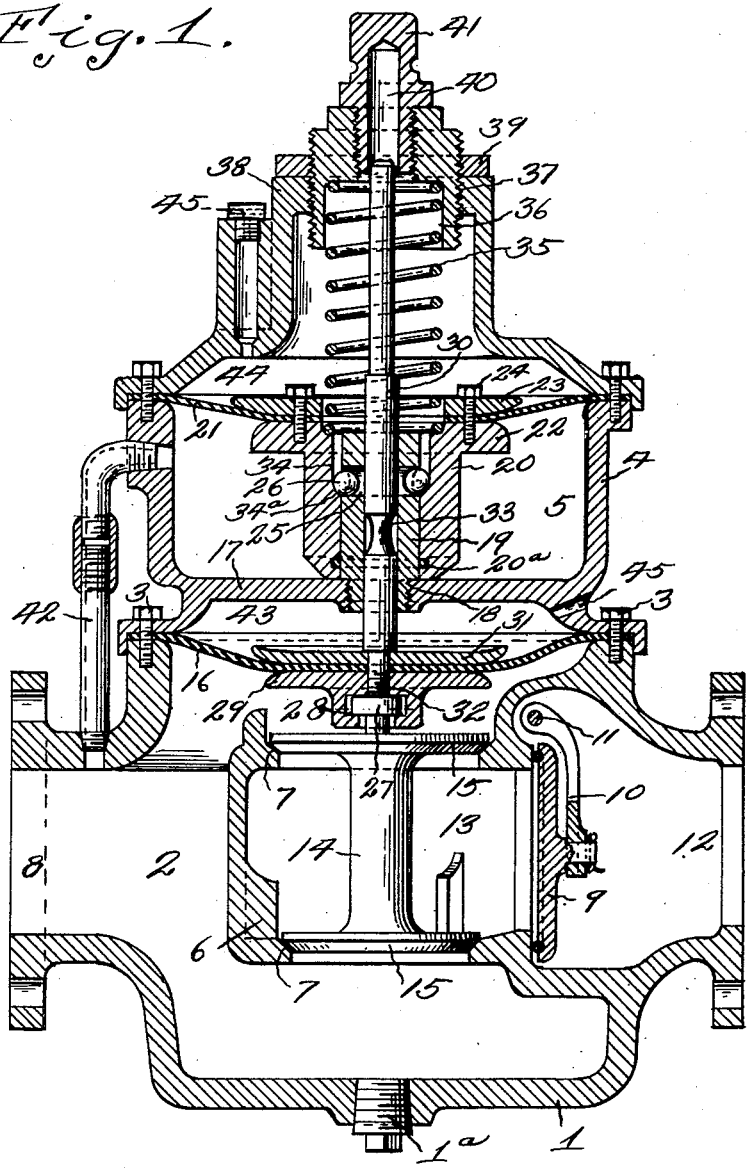

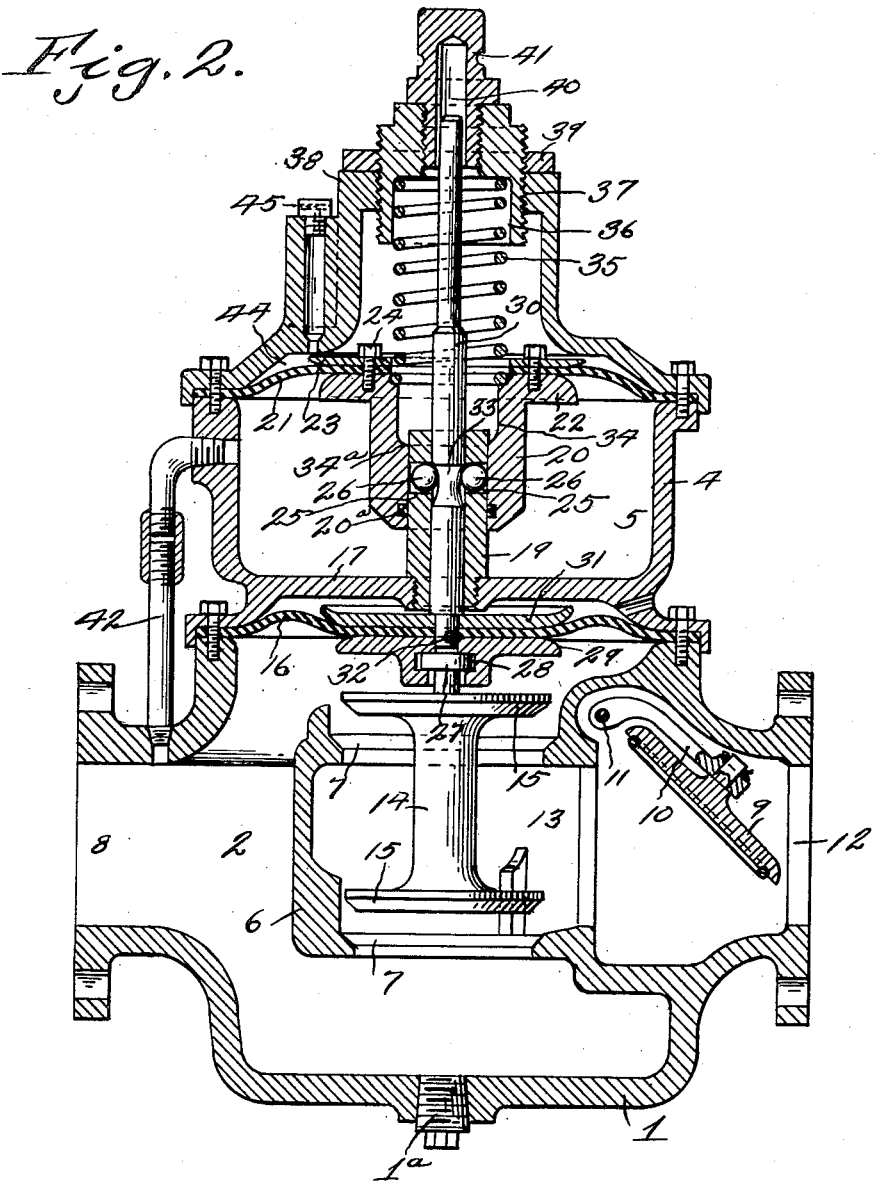

2,692,612

UNITED STATES PATENT OFFICE 2,692,612

PRESSURE CONTROLLED FLOW
REGULATOR VALVE

Phillips B. Drane, Tulsa, Okla.

Application July 14, 1950, Serial No. 173,916

2 Claims. (Cl. 137—510)

The invention relates to pressure controlled flow regulator valves, and has for its object to provide a device of this kind comprising a double disc valve cooperating with spaced seats and controlled by a diaphragm, and a second diaphragm control mechanism for automatically holding the disc valves in open position when the maximum regulated pressure of fluid, passing through the valve, is reached, and allowing a differential of pressure and automatically allowing the seating of the spaced disc valves when the minimum pressure is reached.

A further object is to provide check valve means for the down-stream side, which check valve is flow opened by the fluid passing through the regulator, and automatically closed upon closing of the regulator, thereby preventing back pressure from the discharge side of the regulator.

A further object is to provide the diaphragm, in the main chamber, with a vertically movable stem slidably mounted and extending upwardly through the auxiliary chamber in a stationary sleeve bearing, and through the auxiliary diaphragm, and radially movable latching balls at a constant elevation within the auxiliary chamber, and cooperating with a shoulder formed by an angular groove in the stem for holding the main diaphragm in open position, and a shouldered member carried by the auxiliary diaphragm and cooperating with the radially movable members upon outward movement for releasing the stem and allowing the valves carried by the main diaphragm to seat upon the falling of pressure within the main chamber below the main diaphragm below a predetermined pressure.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a vertical longitudinal sectional view through the flow regulator valve.

Figure 2 is a view similar to Figure 1, but showing the regulator valve open.

Referring to the drawings, the numeral 1 designates the main body of the regulator, and 2 the main chamber therein. Secured to the upper side of the body 1 by means of bolts 3 is an upper casing 4 having an auxiliary control chamber 5, therein. Disposed within the chamber 2 is a valve cage 6 having spaced valve seats 7. Liquid, under pressure, passes through the regulator from left to right through the intake 8, and thence through the valve seats 7, opening the check valve 9 carried by the hinged arm 10, pivotally mounted at 11 and thence to the downstream side through the discharge opening 12. Vertically and axially movable in the valve cage chamber 13 is a disc valve spool 14, which spool has upper and lower disc valves 15, cooperating with the valve seats 7.

By providing two disc valves the flow of fluid may be materially increased.

The auxiliary chamber 5 is separated from the main chamber 2 by the main diaphragm 16 and horizontal partition 17. Threaded at 18 into the partition 17 is a guide sleeve 19, which guide sleeve remains stationary at all times, and on which sleeve is slidably mounted a control sleeve 20 carried by the auxiliary diaphragm 21 at the upper end of the auxiliary chamber 5. The sleeve 20, at its upper end, terminates in a diaphragm clamping disc 22, which engages the under side of the diaphragm 21, there being a clamping ring 23 engaging the upper side of the diaphragm 21, and these parts are held together by bolts 24.

The stationary sleeve 19 is provided with radial apertures 25, in which apertures are radially movable balls 26 forming a latching means.

The upper end of the valve spool 14 is provided with a headed member 27, connected at 28 to the under side of the diaphragm disc 29. Slidably mounted for axial movement in the stationary sleeve 19 is a latching stem 30, the lower end of which stem extends through the diaphragm clamping plate 31 and threaded at 32 into the disc 29, therefore securely clamping the discs together with the latching stem 30, so that as the diaphragm 16 moves upwardly, the latching stem 30 would move upwardly therewith. Latching stem 30 is provided with an annular channel 33 with which the balls 26 cooperate for latching the valves in open position, and at which time the balls 26 are in the position shown in Figure 2, and in engagement with the shoulder formed by the counterbore 34 in the latching sleeve 20. Latching sleeve 20 is normally forced downwardly by an expansion spring 35, which spring extends through the diaphragm 21 and seats on the upper end of the sleeve 20. The upper end of the spring 35 is disposed in a tensioning bushing 36, which bushing is threaded at 37 in the upper end of a bonnet 38 and held in adjusted position by the lock nut 39. Therefore it will be seen that the tension of the spring can be varied for adjusting the range of pressure operation of the device.

The upper end of the latching stem 30 extends into the bore 40 of a guide 41.

The intake side of the chamber 2 is in communication with the auxiliary chamber 5 through the by-pass pipe 42 so that fluid entering the intake 8 will pass into the auxiliary chamber 5 and exert an upward pressure on the under side of the auxiliary diaphragm 21 and at the same time is exerting pressure on the under side of the diaphragm 16. The spaces 43 and 44, above the diaphragms, are in communication with the atmosphere through the bleeder ports 45.

Assuming the device is in closed position, as shown in Figure 1, the operation is as follows. The liquid, under pressure, enters the intake opening 8 into the main chamber 2 and also enters the auxiliary chamber 5 through the by-pass pipe 42. Referring to Figure 1, it will be seen that the latching balls 26 are engaging the shoulders formed by the counter bore 34; in other words, partially out of the radial openings 25, hence it will be seen that the auxiliary diaphram is held against upward movement against the action of the pressure regulating spring 35. The main diaphragm 16 moves upwardly, thereby unseating the disc valves 15, and during this upward movement the channeled portion 33 of the stem 30 will eventually assume the position shown in Figure 2 registering with the latching balls 26, and at which time the valves 15 will be latched in open position, as shown in Figure 2. The lower curved portions 34a of the counterbore 34 force the balls inwardly as the sleeve 20, after being released, continues upwardly under the influence of the pressure on the under side of the auxiliary diaphragm 21. It will be noted that there is a limited lost motion between the latching and unlatching of the balls 26, thereby allowing for a differential of operation.

When the device is in closed position, shown in Figure 1, or upon the automatic cutting off to allow the device to again build up pressure on the up-stream side, the check valve 9 closes, thereby preventing back flow from the down-stream side or the exertion of down-stream pressure on the valves 15.

From the above it will be seen that a control means for a valve is provided which is simple in construction, pressure controlled, and one in which there can be no back flow from the down-stream side when the regulator shuts off.

A packing 20a is preferably provided between the sleeve 20 and the stationary guide sleeve 19 for preventing leakage, and the lower end of the body 1 is provided with a removable plug 1a, which plug may be removed for drainage purposes.

The invention having been set forth what is claimed as new and useful is:

1. A latching and releasing means for a pressure actuated valve disposed in a flow chamber of a main casing, comprising an auxiliary casing above the main flow casing and having an auxiliary chamber therein, pressure by-pass means between the chamber of the main casing and the auxiliary chamber, a diaphragm within the main casing chamber and connected to the valve therein, said valve cooperating with a valve seat, a valve stem carried by the diaphragm in the chamber of the main casing and extending upwardly through the auxiliary chamber of the auxiliary casing, said latching means comprising a diaphragm in the auxiliary chamber, a stationary guide sleeve in the auxiliary chamber and through which the valve stem extends and is slidably mounted, a downwardly extending sleeve carried by the under side of the diaphragm in the auxiliary chamber and slidably mounted on the stationary guide sleeve, latching balls in recesses of the guide sleeve and of a size whereby they will be entirely within the recesses when the auxiliary diaphragm is in raised position and when the auxiliary diaphragm is in lowered position will extend outwardly from the sleeve, a shoulder within the diaphragm carried sleeve and cooperating with said balls whereby when the valve in the main chamber is closed the auxiliary diaphragm will be held in lowered position, expansive spring means cooperating with the upper side of the auxiliary diaphragm for normally urging the same downwardly said valve stem having an annular channel positioned below the balls when the valve is in closed position and which moves into registry with said balls when the valve is in open position.

2. The combination with a pressure opened diaphragm controlled valve, said valve cooperating with a valve seat in a flow chamber, of means for latching said valve in open position and allowing said valve to be unlatched and to close, said means comprising an auxiliary casing above the valve and diaphragm and having an auxiliary chamber therein, by-pass means between the flow chamber and the auxiliary chamber, said latching and releasing means comprising a valve stem carried by the diaphragm in the flow chamber and extending through the auxiliary chamber, a guide sleeve in the auxiliary chamber and through which the valve stem extends and slides, a diaphragm within the auxiliary chamber and surrounding the valve stem, a slidable sleeve carried by the under side of the auxiliary diaphragm and slidably mounted on the guide sleeve in the auxiliary chamber, latching balls in the guide sleeve and adapted to move outwardly and inwardly therefrom, said balls having their outer sides in the path of a shoulder formed at the junction of the inner periphery of the slidable sleeve and a counter bore of the slidable sleeve, said valve stem having an annular channel into which the inner sides of the balls move, said channel being below the balls when the valve is closed and in registry with the balls when the valve is open, said counter bore of the slidable sleeve forming means whereby the balls will be allowed to move outwardly upon reduction of pressure in the auxiliary chamber and downward movement of the slidable sleeve, thereby releasing the stem and allowing the valve to close.

References Cited in the file of this patent

UNITED STATES PATENTS

| Number | Name | Date |
|---|---|---|
| 924,257 | Miller | June 8, 1909 |
| 1,480,942 | McKee | Jan. 15, 1924 |
| 1,612,567 | Browne | Dec. 28, 1926 |
| 1,624,130 | Beggs | Apr. 12, 1927 |
| 1,733,528 | Davis | Oct. 29, 1929 |
| 1,770,912 | Clapp | July 22, 1930 |
| 2,216,296 | Raymond | Oct. 1, 1940 |